US012005007B2

(12) United States Patent
Li et al.

(10) Patent No.: US 12,005,007 B2
(45) Date of Patent: Jun. 11, 2024

(54) WHEELCHAIR FOR PREVENTING SECONDARY TRANSMISSION OF GERMS

(71) Applicant: Sichuan AST Medical Equipment Co., Ltd, Sichuan (CN)

(72) Inventors: Yunshun Li, Sichuan (CN); Mingqiu Du, Sichuan (CN); Jinhai Yang, Sichuan (CN)

(73) Assignee: Sichuan AST Medical Equipment Co., Ltd, Luzhou (CN)

(*) Notice: Subject to any disclaimer, the term of this patent is extended or adjusted under 35 U.S.C. 154(b) by 0 days.

(21) Appl. No.: 18/532,712

(22) Filed: Dec. 7, 2023

(65) Prior Publication Data

US 2024/0115441 A1 Apr. 11, 2024

(30) Foreign Application Priority Data

Oct. 9, 2023 (CN) ........................ 202322717192.5

(51) Int. Cl.

*A61G 5/02* (2006.01)
*A61G 5/10* (2006.01)
*A61G 5/12* (2006.01)

(52) U.S. Cl.

CPC ............... *A61G 5/021* (2013.01); *A61G 5/10* (2013.01); *A61G 5/1018* (2013.01); *A61G 5/125* (2016.11); *A61G 5/128* (2016.11)

(58) Field of Classification Search

CPC ........ A61G 5/021; A61G 5/125; A61G 5/128; A61G 5/10; A61G 5/1018; A61G 5/023

See application file for complete search history.

(56) References Cited

U.S. PATENT DOCUMENTS 4,380,343 A * 4/1983 Lovell ...................... A61G 5/08 280/250
4,512,588 A * 4/1985 Cox ...................... A61G 5/026 180/8.2
4,618,155 A * 10/1986 Jayne ...................... A61G 5/023 280/5.3
4,625,984 A * 12/1986 Kitrell ...................... A61G 5/026 280/250
5,609,348 A * 3/1997 Galumbeck .......... A61G 5/1086 297/423.19
6,257,608 B1 * 7/2001 Hanson .................. A61G 5/026 280/250.1
7,077,416 B2 * 7/2006 Duarte ..................... A61G 5/14 297/DIG. 10

(Continued)

*Primary Examiner* — Kevin Hurley
*Assistant Examiner* — Michael R Stabley

(57) ABSTRACT

A wheelchair that prevents the secondary transmission of germs, including a seat, a drive mechanism, antibacterial fabric, and a dirt-retaining board. The drive mechanism is symmetrically provided about the seat. The drive mechanism includes a frame, front wheels, rear wheels, and drive wheels. The frame is fixedly connected to the seat. The front wheels, the rear wheels, and the drive wheels are all rotated and set on the frame. The drive wheels are not coaxial with the front wheels and rear wheels and do not interfere with each other. Drive wheels are connected to the rear wheels by transmission. The dirt-retaining boards are installed on the rear wheels in coordination. The active wheels, the seat, the armrests, and the push handles are sleeved thereon with antimicrobial fabric.

13 Claims, 8 Drawing Sheets

(56) References Cited

U.S. PATENT DOCUMENTS

| | | | | |
|---|---|---|---|---|
| 8,905,421 | B2 * | 12/2014 | Hansen | A61G 5/023 74/552 |
| 9,233,034 | B2 * | 1/2016 | Storm | A61G 5/10 |
| 9,445,958 | B2 * | 9/2016 | Hansen | A61G 5/024 |
| 9,795,522 | B2 * | 10/2017 | Hansen | A61G 5/0875 |
| 9,980,863 | B2 * | 5/2018 | Hansen | A61G 5/0875 |
| 10,695,239 | B2 * | 6/2020 | Hansen | A61G 5/0875 |
| 2008/0111338 | A1 * | 5/2008 | Ilan | A61G 5/1002 280/250.1 |
| 2022/0072917 | A1 * | 3/2022 | Brown | A61G 5/10 |
| 2022/0280360 | A1 * | 9/2022 | Hansen | A61G 5/022 |
| 2022/0387233 | A1 * | 12/2022 | Morin | A61G 5/023 |

* cited by examiner

WHEELCHAIR FOR PREVENTING SECONDARY TRANSMISSION OF GERMS

CROSS-REFERENCE TO RELATED APPLICATION

This application claims priority from the Chinese patent application 2023227171925 filed Oct. 9, 2023, the content of which is incorporated herein in the entirety by reference.

TECHNICAL FIELD

The disclosure relates to the technical field of wheelchairs, and specifically to a wheelchair for preventing the secondary transmission of germs.

BACKGROUND

A wheelchair is a chair provided with wheels to help replace walking and is an important mobility tool for home-based rehabilitation, turnover transportation, medical consultation, and outing activities for the injured, the sick, and the disabled. Based on the driving form, wheelchairs can be divided into electric and manual wheelchairs. Hand rims are unique to the manual wheelchair, and typically have a diameter 5 cm smaller than the large rims. When a person with hemiplegia actuates the wheelchair with one hand, smaller diameter hand rims are added as an option.

The hand rims are generally driven directly by the patient. If the patient suffers from an infectious disease or is susceptible to infection, when driving traditional hand rims, the hand of the patient is very easily in contact with the large rims, and infectious germs on the hand of the patient may contact the large rims and be subsequently transmitted to the ground and other environments via the large rims, resulting in secondary contamination. In addition, the contaminated germs in the environment and other germs are easily transmitted to the patient via the large wheel, which may lead to secondary transmission between the germs and patients.

SUMMARY

The purpose of the disclosure is to provide a wheelchair to prevent the secondary transmission of germs. It solves the problem where when the patient drives a traditional wheelchair, a hand of the patient may easily come in contact with the large rims, so infectious germs from the hands of the patient contact the large rims and are then transmitted to the ground and other environments via the large rims, resulting in secondary contamination. In addition, the contaminated germs in the environment and other germs are easily transmitted to the patient via the large rims, which may lead to secondary transmission between the germs and patients.

An embodiment of the disclosure is realized by the following technical solution, the wheelchair for preventing the secondary transmission of germs, including a seat, a driving mechanism, and antibacterial fabric.

The drive mechanism includes the frame, front wheels, rear wheels, and drive wheels. The frame is fixedly connected to the seat. The front wheels, the rear wheels, and the drive wheels are installed on the frame.

The drive wheels are not coaxial with the front wheels and the rear wheels. There is no interference between the drive wheels, the front wheels, and the rear wheels. The drive wheels are connected to the rear wheels by transmission.

The drive wheels are covered with antimicrobial fabric.

Furthermore, the wheelchair includes active wheels, slave wheels, and a transmission belt. The active wheels are coaxially provided with the drive wheels, and the active wheels and the drive wheels are connected by transmission.

The slave wheels and the rear wheels are coaxially provided and connected by transmission. The active wheels and the slave wheels are connected by the transmission belt.

The front wheels are universal.

Two groups of drive mechanisms are symmetrically set concerning the seat.

The frame is set with a support rod extending diagonally downwardly at the front end, and footplates are provided at the end of the free ends of the support rod.

The rear ends of the foot treadles are set with limiting members which are arc-shaped. The wheelchair further includes wheelchair parking brakes. The wheelchair parking brakes are fixedly provided on the frame. The wheelchair parking brakes are configured for braking of the rear wheels.

Armrests are provided on the left and right side of the seat. Two push handles are symmetrically provided at the back of the seat.

The seat, the armrests, and the push handles are all covered with antimicrobial fabric. Furthermore, the wheelchair comprises dirt-retaining boards and they are cooperatively provided thereon with the rear wheels.

The technical solution of the implementation example of the disclosure has at least the following advantages and beneficial effects:

1. The front wheels and the rear wheels are set on the left and right sides at the lower end of the front and rear of the frame. The front wheels and the rear wheels of the drive mechanism on the two sides constitute a four-wheel support, which forms the basic mobile structure of the wheelchair. The drive wheels are rotatably set on the frame, above the front wheels and the rear wheels, do not directly contact the front wheels and the rear wheels, and are located at a higher height from the ground. The drive wheels are connected to the rear wheels by transmission. The patient controls the wheelchair forward, backward, or steering by turning the drive wheels on the two sides. The drive wheels drive the active wheels to rotate synchronously. The active wheels drive the slave wheels to rotate through the transmission belt, and then drive the rear wheels to rotate. The rear wheels serve as the main wheels of the wheelchair driving on the ground. The patient controls the two rear wheels to synchronously move forward or backward to move the wheelchair forward or backward. The patient controls the two rear wheels to rotate oppositely so that the wheelchair is turned leftwards and rightwards. A specific moving posture can be further controlled by the drive wheels. The patient does not have contact with the grounded wheels. The following problems have been solved: when the patient drives a traditional wheelchair, the hands of the patient very easily come into contact with the large wheel rim, so infectious germs on the hands of the patient first contact the large rims, and then are transmitted to the ground and other environments via the large rims, resulting in secondary contamination; in addition, the contaminated germs in the environment and other germs are easily transmitted to the patient via the large rims, which is likely to lead to the secondary transmission of the germs in a forward and backward manner, and other problems.
2. The drive wheels are sleeved with antimicrobial fabric. The seat, the armrests, and the push handles are all provided thereon with the antimicrobial fabric. A textile fabric consisting of fibers, due to the shape of a porous object thereof and the chemical structure of a polymer, is conducive to microbial attachment and becomes a good host for microbes to survive and reproduce. In addition to the hazards of a parasite on human beings, the parasite also contaminates the fibers. Therefore, the main objective of the antimicrobial fabric is to eliminate these adverse effects. The antimicrobial fabric has a good antibacterial effect and can eliminate an odor due to bacteria so that the fabric stays neat and clean. In addition, the antimicrobial fabric avoids reproduction of bacteria and can play a role in reducing the risk of re-transmission, which in turn, to a certain extent, can prevent bacterial residues on the drive wheels, the seat, the armrests, and the push handles.

3. The two rear wheels are cooperatively provided with a dirt-retaining board. The dirt-retaining board may prevent harmful substances such as mud, water, and germs adhering to the rear wheels from splashing onto the drive wheels during the wheelchair's travel, realizing the physical isolation of the drive wheels from the rear wheels and further avoiding secondary infections caused by harmful substances adhering to the hands of the patient, when the patient drives the drive wheels.

BRIEF DESCRIPTION OF THE DRAWINGS

To more clearly describe the technical solutions of embodiments of the disclosure, give the following brief introduction of the drawings that need to be used in the embodiments of the disclosure. It should be understood that the following drawings only show certain embodiments of the disclosure, but should not be regarded as a limitation of the scope. A person skilled in the art can obtain other related drawings based on these drawings without creative work.

REFERENCE NUMERALS

Figure 1:
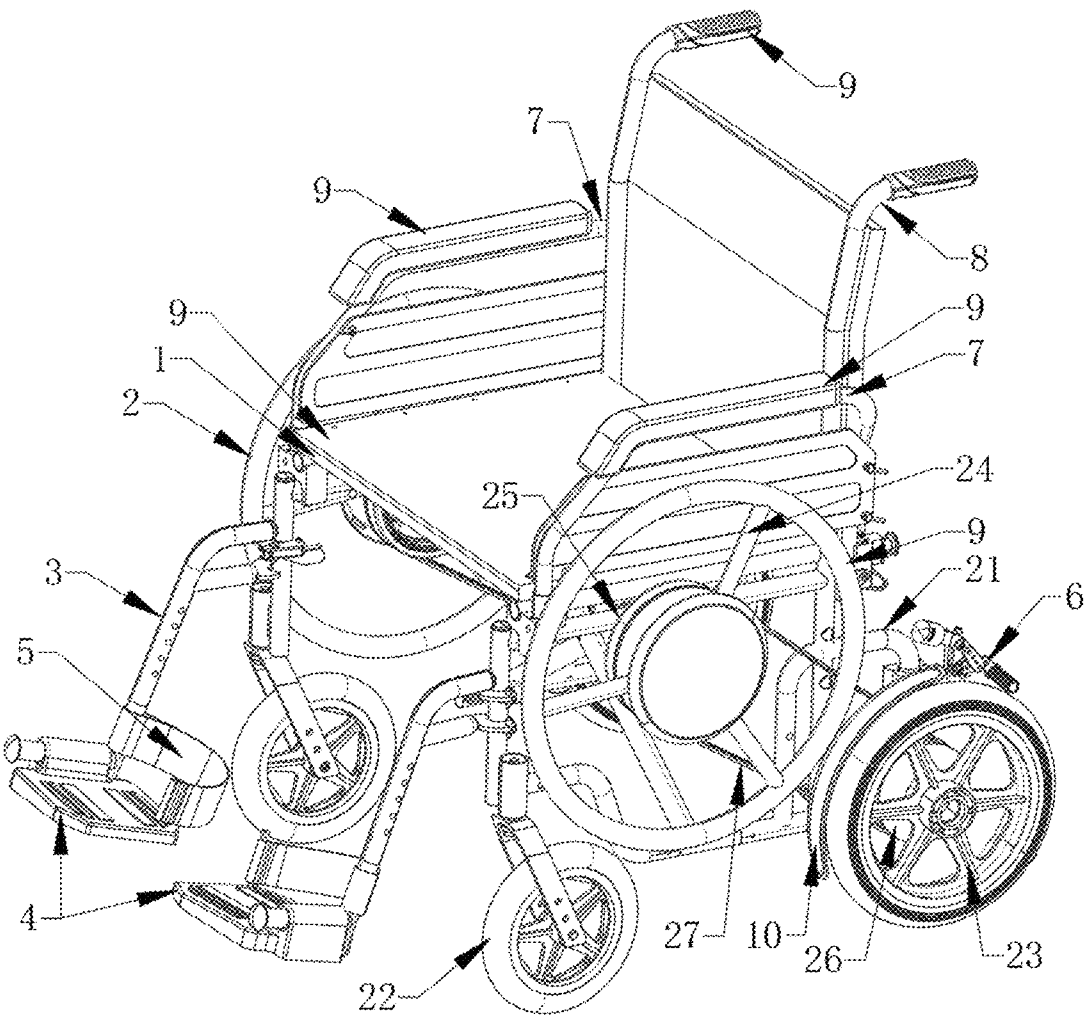
FIG. 1 shows a schematic structural perspective diagram of the wheelchair for preventing the secondary transmission of germs provided by the disclosure.

1, seat, 2, drive mechanism, 21, frame, 22, front wheels, 23, rear wheels, 24, drive wheels, 25, active wheels, 251, the first bearing, 252, first axle bar, 253, first nut, 254, first axle sleeve, 26, slave wheels, 261, second axle bar, 262, fixing plate, 263, second nut, 264, second axle sleeve, 27, transmission belt, 3, support bar, 4, footplate, 5, limiting member, 6, wheelchair parking brake, 7, armrests, 8, push handles, 9, antimicrobial fabric, 10, dirt-retaining board, 11, safety guard board

DETAILED DESCRIPTION OF EMBODIMENTS

To make the objectives, technical solutions, and advantages of the embodiments of the disclosure clearer, the following clearly and completely describes the technical solutions in embodiments of the disclosure in conjunction with the drawings in the embodiments of the disclosure. The described embodiments are a part of the embodiments of the disclosure, rather than all embodiments. The components of the embodiments of the disclosure generally described and illustrated in the drawings herein can be arranged and designed in various configurations.

Therefore, the following detailed description of the embodiments of the disclosure provided in the drawings is not intended to limit the scope of the claimed invention but merely represents selected embodiments of the disclosure. Based on the embodiments of the disclosure, all other embodiments obtained by a person skilled in the art without creative work shall fall within the protection scope of the disclosure.

Embodiment 1

Figure 2:
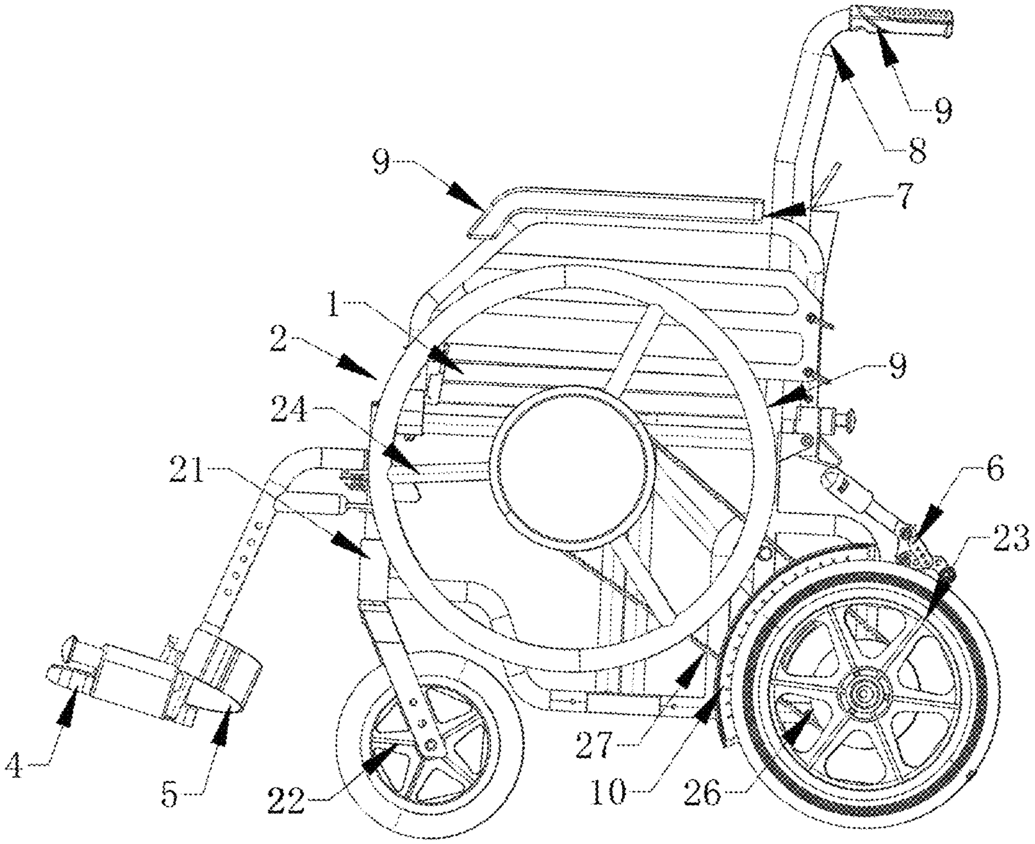
FIG. 2 shows a main diagram of the wheelchair for preventing the secondary transmission of germs provided by the disclosure.
Figure 3:
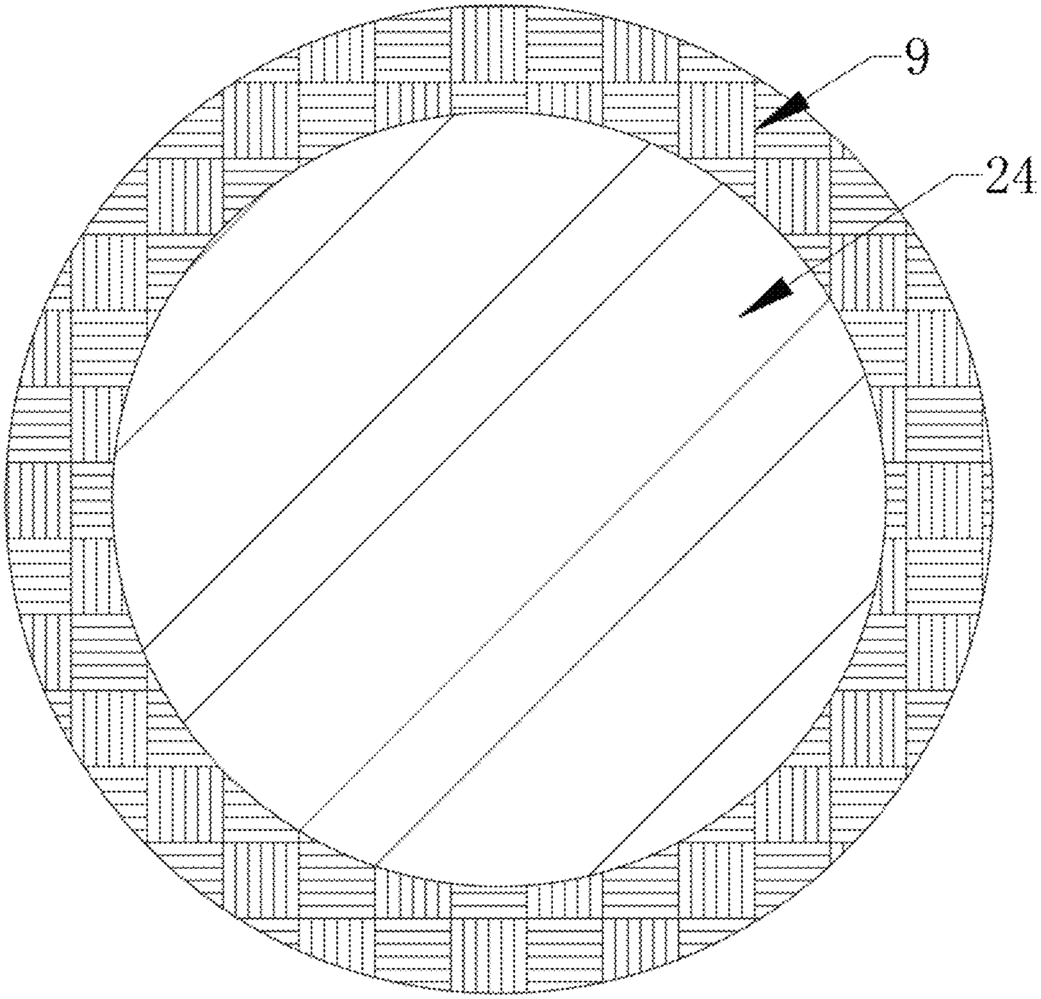
FIG. 3 shows a schematic diagram of a cross-section of a drive wheel cooperating with antimicrobial fabric in the wheelchair for preventing the secondary transmission of germs provided by the disclosure.
Figure 4:
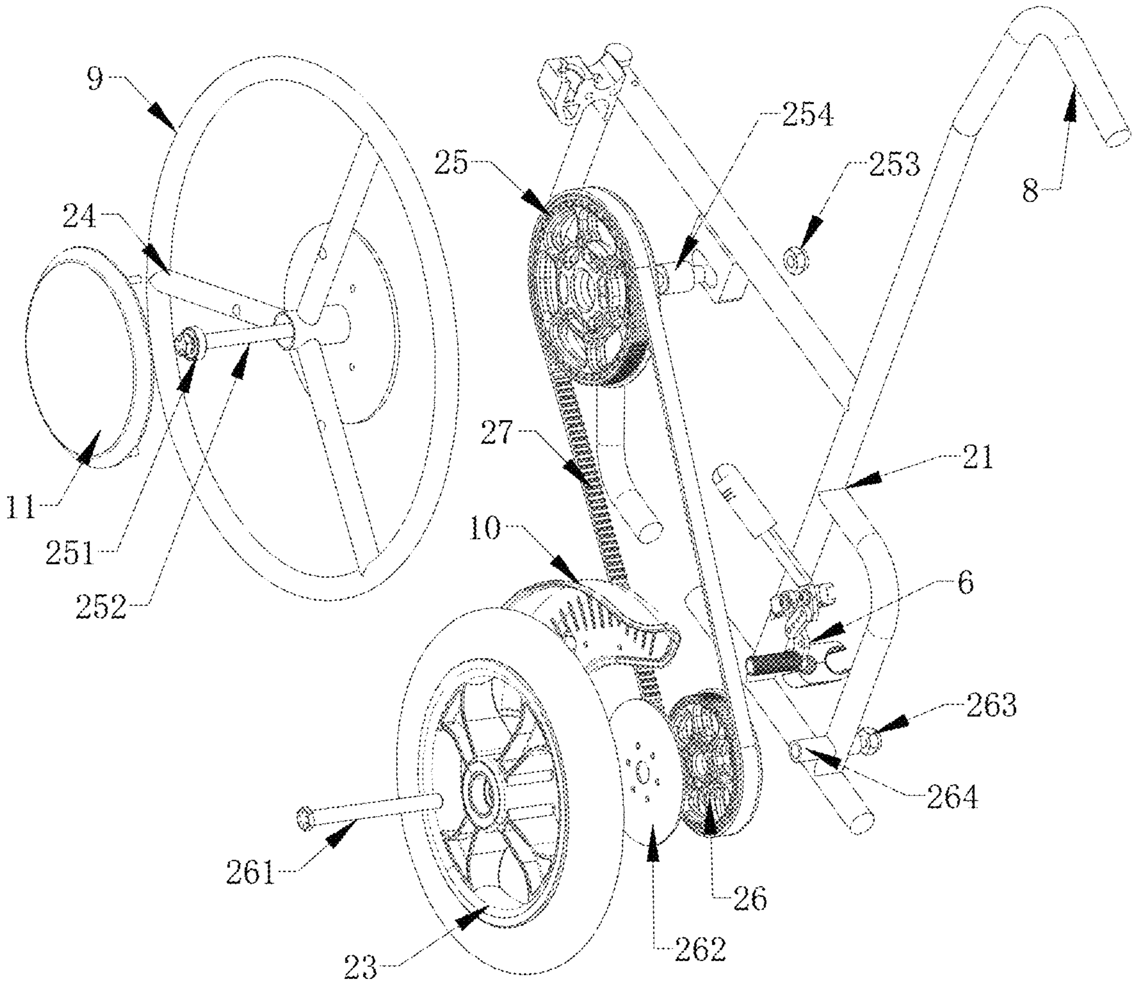
FIG. 4 shows a schematic structural diagram in which drive wheels, active wheels, slave wheels, and a transmission belt cooperate in the wheelchair to prevent the secondary transmission of germs provided by the disclosure.
Figure 5:
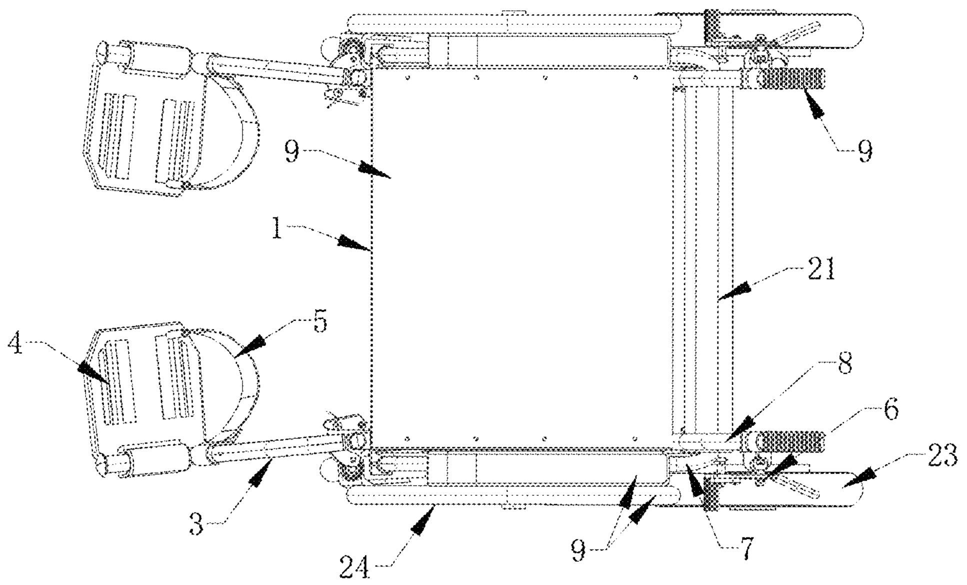
FIG. 5 shows a top view of the wheelchair for preventing the secondary transmission of germs provided by the disclosure.
Figure 6:
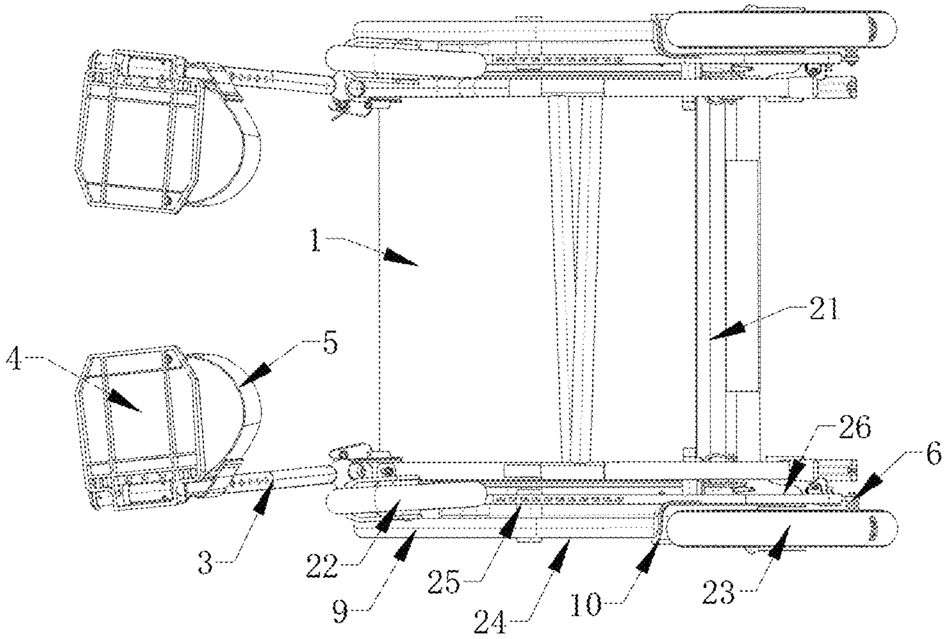
FIG. 6 shows a bottom view of the wheelchair for preventing the secondary transmission of germs provided by the disclosure.
Figure 7:
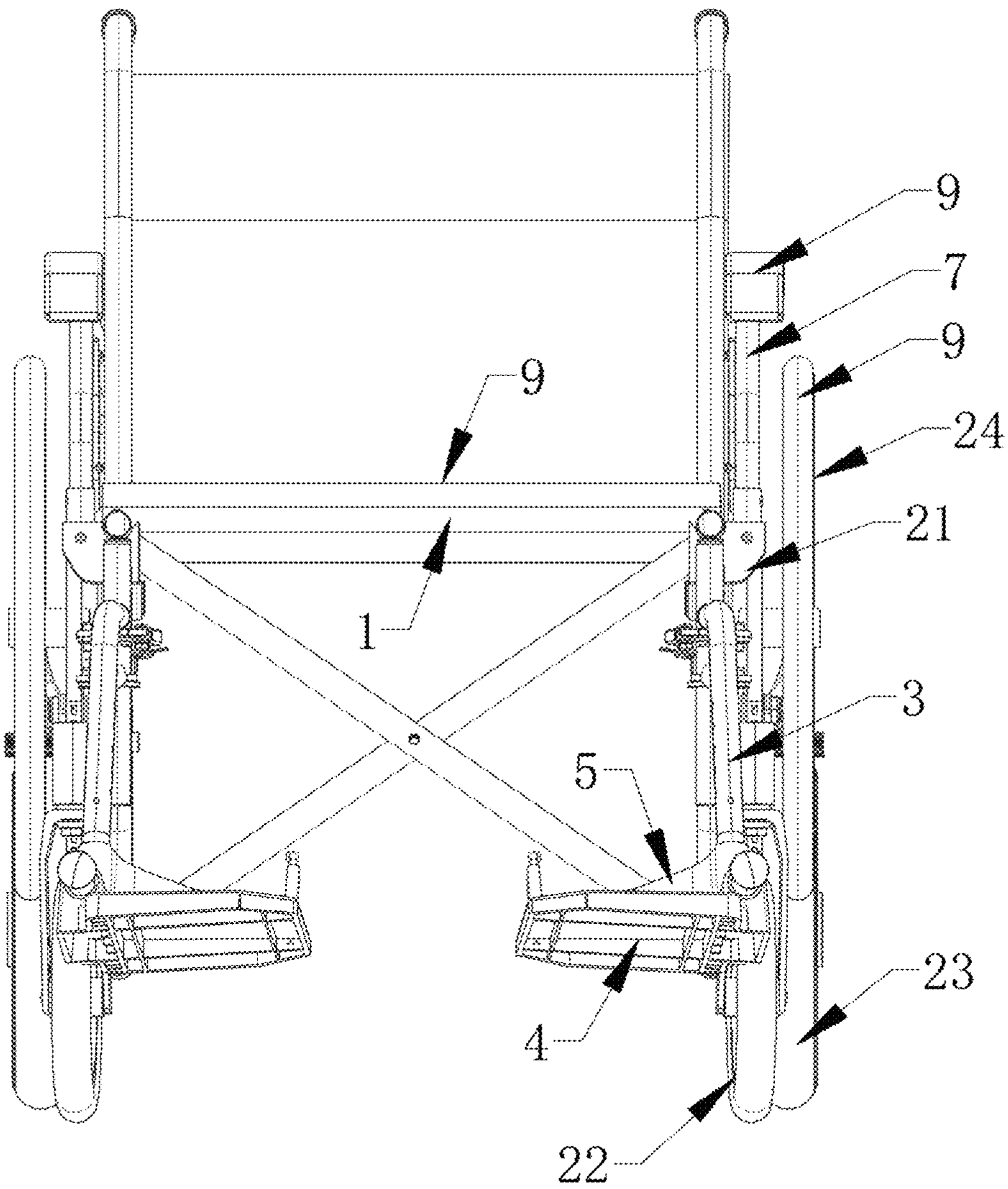
FIG. 7 shows a front view of the wheelchair for preventing the secondary transmission of germs provided by the disclosure.
Figure 8:
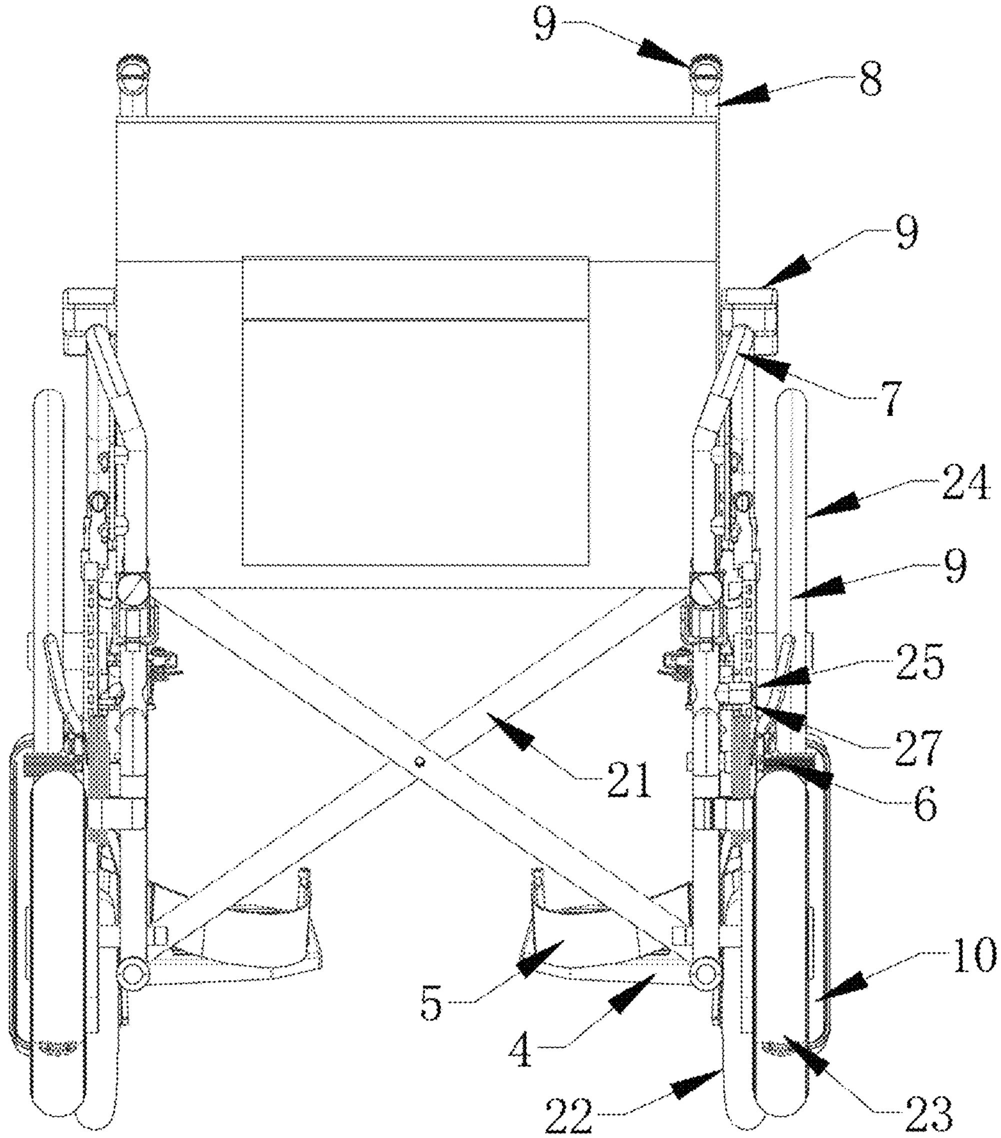
FIG. 8 shows a rear view of the wheelchair for preventing the secondary transmission of germs provided by the disclosure.

Referring to FIGS. 1 to 3, Embodiment 1 provides a wheelchair for preventing the secondary transmission of germs, including a seat 1, a drive mechanism 2 symmetrically arranged at the bottoms of the left and right sides of the seat 1, and an antimicrobial fabric 9. The transmission forms of two groups of drive mechanism 2 are independent of each other;

As shown in FIGS. 1 and 2, the drive mechanism 2 includes a frame 21, front wheels 22, rear wheels 23, and drive wheels 24. The upper end of the frame 21 is fixedly connected to the seat 1. The two frames are fixed with each other by a fixing rod, which constitutes a good support structure to provide a good support base for the seat. The drive wheels 24 are not coaxial with the front wheels 22 and the rear wheels 23. There is no interference between the drive wheels 24, the front wheels 22, and the rear wheels 23. The frame 21 is mainly made of iron or aluminum alloy by welding. The front wheels 22 are universal. Fork arms of the front wheels 22 are made of iron or aluminum alloy and may also be made of plastic. The fork arms and frame 21 are rotatably connected. The front wheels 21 have an outer diameter in a range of 5 inches to 13 inches and are formed by plastic wheels and PU tires, plastic wheels and air-filled tires, or plastic wheels and PVC tires. The rear wheels 23 are directly rotatably provided on frame 21. The rear wheels 23 have an outside diameter in the range of 5 inches to 24 inches and are formed by plastic wheels and PU tires, plastic wheels and air-filled tires, spoke wheels and PU tires, or wire wheels and air-filled tires.

More specifically, the seat 1 has a length and a width both in a range of 250 mm-950 mm. A fire-resistant nylon fabric having a thickness of 5 mm-100 mm is laid on seat 1. The drive wheel 24 has a diameter in the range of 100 mm-650 mm. The distance from the outer diameter of the drive wheels 24 to the outer diameter of the rear wheels 23 ranges from 30 mm to 200 mm. The rear wheels 23 have a diameter in a range of 120 mm-650 mm.

The front wheels 22 and the rear wheels 23 are provided on the left and right sides at the lower end of the front and rear of the frame 21, respectively. The front wheels 22 and the rear wheels 23 of the drive mechanisms on two sides constitute a four-wheeled support to form the basic mobile structure of the wheelchair. The drive wheels 24 are rotatably provided on the frame 21, above the front wheels 22 and the rear wheels 23, are not in direct contact with the front wheels 22 and the rear wheels 22, and have a higher height from the ground so that germs are not easy to adhere to the drive wheels. The drive wheels 24 are connected to the rear wheels 23 by transmission.

More specifically, as shown in FIGS. 1-4, the wheelchair also includes active wheels 25, slave wheels 26, and a transmission belt 27. The active wheels 25 are coaxially provided with the drive wheels 24. The active wheels 25 are fixed coaxially with the drive wheels 24 by a bolt. The active wheels 25 and the slave wheels 24 are rotatably arranged on a first axle bar 252. The first axle bar 252 is rotatably connected to the frame 21 by a first axle sleeve 254. The end of the first axle bar 252 close to the frame 21 is limited by the first nut 253, and cooperates with the first axle sleeve 254 so that the first axle bar 252 is rotatably arranged on the frame 21. The slave wheels 26 and the rear wheels 23 are coaxially and connected by transmission. The slave wheels 26 are fixed at the rear wheels 23 via a fixing board 262, while the slave wheels 26 and the rear wheels are rotatably sleeved on the second axle rod 261. The second axle bar 261 is rotatably arranged on the frame 21 via a second axle sleeve 264 and then limited by the second nut 263, so that the slave wheels 26 and the rear wheels 23 are rotatably arranged on the frame 21. A transmission structure is formed by the active wheels 25, the slave wheels 26, and the transmission belt 27, may include a synchronous pulley, a belt pulley, or a sprocket, and may realize the synchronous transmission of the active wheels 25 and the slave wheels 26. It should be noted that, to prevent the hand from being accidentally rolled between the active wheels 25 and the transmission belt, which may pinch or sprain the hand, the outer sides of the active wheels 25 are provided with safety protection boards. A safety guard board 11 is provided on the outer side of the active wheels 25. The safety guard board 11 is rotatably connected to the first axle bar 252 via the first bearing 251, while a pin is provided in the inner side of the safety guard board 11 and embedded into and fixed to the drive wheels 24. Further, the safety guard board 11 is rotated synchronously with the drive wheels 24. The safety protection boards form a barrier to the hand, thereby avoiding involvement between the active wheels 25 and the transmission belt 27.

Specifically, the patient controls the wheelchair forward, backward, or steering by turning the drive wheels 24 on two sides. The drive wheels 25 drive the active wheels to rotate synchronously. The active wheels 25 drive the slave wheels 26 to rotate through the transmission belt 27, and further drive the rear wheels 26 to rotate. The rear wheels 23 serve as the main wheels of the wheelchair driving on the ground. The patient controls the two rear wheels 23 to synchronously rotate forward or backward so that the wheelchair moves forward or backward. The patient controls the two rear wheels 23 to rotate in opposite directions so that the wheelchair is turned left and right. A specific moving posture can be further controlled by the drive wheels 24. The patient does not have contact with the grounded wheels. This solves the following problems: when the patient drives a traditional wheelchair, the hands of the patient very easily come into contact with the large rims, so infectious germs on the hands of the patient first contact the large rims, and then are transmitted to the ground and other environments via the large rims, resulting in secondary contamination; in addition, the contaminated germs in the environment and other germs are easily transmitted to the patient via the large rims, which is likely to lead to the secondary transmission of the germs in a forward and backward manner, and other problems.

As shown in FIGS. 1 and 2, the front wheels 22 are the universal wheels to facilitate traveling operations such as the steering of the wheelchair.

As shown in FIGS. 1 and 2, in a specific implementation, the front end of frame 21 is provided with a support rod 3 extending diagonally downward. The support rod 3 is detachably connected to the frame 21. The support rod can adopt a structure that can be telescoped. Adjusting the length of the telescoping of the support rod 3 allows for use by patients with different leg lengths. The support rods 3 are mainly made of iron or aluminum alloy. In addition, footplates 4 are provided at the ends of the free ends of the support rod 3. The footplates 4 are mainly configured to carry the patient's feet and are mainly made of plastic or aluminum alloy. In addition, a limiting member 5 is provided at the rear end of the footplates 4. The limit members 5 are arc-shaped can be adhered with the patient's heels, and are convenient for the patient's feet to be placed and supported.

More specifically, as shown in FIGS. 1 and 2, the wheelchair also includes wheelchair parking brakes 6. The wheelchair parking brakes 6 are fixedly installed on frame 21. The wheelchair parking brakes 6 are configured for braking of the rear wheels 23, facilitating the stopping of the wheelchair, as well as preventing the wheelchair from sliding away when the patient gets in and out of the wheelchair.

In addition, the left and right ends of seat 1 are installed with armrests 7 to provide support for the patient's hands, and also to limit the patient's left and right sides. The armrests 7 may be flip-up and detachable armrests, or may be flip-up, detachable, height adjustable, and forward and backward adjustable. The material of a support main body can be made of PU material, aluminum alloy, or iron. There is a flip-up plastic guard provided on the surface of the support main body.

Two push handles 8 are symmetrically provided at the back of seat 1 to facilitate operations such as pushing a wheelchair by a healthcare worker.

Embodiment 2

Based on Embodiment 1, as shown in FIGS. 1-3, drive wheels 24 are sleeved with antimicrobial fabric 9. Seat 1, armrests 7, and push handles 8 are all provided thereon with the antimicrobial fabric 9. A textile fabric consisting of fibers, due to the shape of a porous object thereof and the chemical structure of a polymer, is conducive to microbial attachment and becomes a good host for microbes to survive and reproduce. In addition to the hazards of a parasite on human beings, the parasite also contaminates the fibers. Therefore, the main objective of the antimicrobial fabric 9 is to eliminate these adverse effects. The antimicrobial fabric 9 has a good antibacterial effect and can eliminate an odor due to bacteria so that the fabric stays neat and clean. In addition, the antimicrobial fabric avoids the reproduction of bacteria and can play a role in reducing the risk of re-transmission, which in turn, to a certain extent, can prevent bacterial residues on the drive wheels 24, the seat 1, the armrests 7, and the push handles, thereby avoiding second infection.

It should be noted that, due to the antimicrobial fabric 9 accumulates more pollutants in the use of a process over a long period, and needs to be replaced promptly after the use for some time. Therefore, the antimicrobial fabric 9 is arranged in a removable way, which may be a velcro, a zipper a button, and so on. Especially when the wheelchair is used in a hospital after each patient uses up, the antimicrobial fabric 9 needs to be replaced with a new one. Thus, the antimicrobial fabric 9 is arranged to be removable, which is more practical.

Embodiment 3

Based on Embodiments 1 and 2, as shown in FIGS. 1-3, a wheelchair also includes two dirt-retaining boards 10. Two rear wheels 23 are cooperatively provided with the dirt-retaining board 10. The dirt-retaining board 10 is fixed to the frame 21 by a bracket. The dirt-retaining board 10 may prevent harmful substances such as mud, water, and germs adhering to the rear wheels 23 from splashing onto the drive wheels 24 during the wheelchair's travel, realizing the physical isolation of the drive wheels 24 from the rear wheels 23 and further avoiding secondary infections caused by harmful substances adhering to hands of the patient when the patient drives the drive wheels. The dirt-retaining board 10 gets spaced from the surface of the tire of the rear wheels 24 in a range of 5 mm-30 mm.

The above are only preferred embodiments of the disclosure but are not intended to limit the disclosure. For a person skilled in the art, the disclosure may have various changes and variations. Any modification, equivalent replacement, improvement, etc. made within the spirit and principles of the disclosure shall be included in the scope of protection of the disclosure.

What is claimed is:

1. A wheelchair for preventing secondary transmission of germs, comprising a seat (1), a driving mechanism (2), and antibacterial fabric (9); the drive mechanism (2) comprises a frame (21), front wheels (22), rear wheels (23), and drive wheels (24), wherein the frame (21) is fixedly connected to the seat (1), wherein an upper end of the frame (21) is fixedly connected to the seat (1); the two frames are fixed with each other by a fixing rod which constitutes a good support structure to provide a support base for the seat;

the front wheels (22), the rear wheels (23), and the drive wheels (24) are rotatably provided on the frame, wherein the front wheels (22) and the rear wheels (23) are provided on the left and right sides at the lower end of the front and rear of the frame (21), respectively; the front wheels (22) and the rear wheels (23) of the drive mechanisms on two sides constitute a four-wheeled support to form the basic mobile structure of the wheelchair; the drive wheels (24 are rotatably provided on the frame (21), above the front wheels (22) and the rear wheels (23), are not in direct contact with the front wheels (22) and the rear wheels (22), and have a higher height from the ground so that germs are not easy to adhere to the drive wheels (24);

the drive wheels (24) are not coaxial with the front wheels (22) and the rear wheels (23), no interference is disclosed between the drive wheels (24), the front wheels (22), and the rear wheels (23), and the drive wheels are connected to the rear wheels (23) by transmission;

the drive wheels (24) are sleeved thereon with the antimicrobial fabric (9);

further comprising active wheels (25) and a transmission belt (27);

between the active wheels (25) and the transmission belt (27), the outer sides of the active wheels (25) are provided with a safety guard board (11); and the safety guard board (11) is rotatably connected to a first axle bar (252) via a first bearing (251), while a pin is provided in the inner side of the safety guard board (11) and embedded into and fixed to the drive wheels (24); the safety guard board (11) is rotated synchronously with the drive wheels (24); and the safety guard boards form a barrier to the hand, thereby avoiding involvement between the active wheels (25) and the transmission belt (27); and drive wheels 24 are sleeved with antimicrobial fabric (9); seat (1), armrests (7), and push handles (8) are all provided thereon with the antimicrobial fabric (9); and the antimicrobial fabric (9) has an antibacterial effect and eliminates an odor due to bacteria and the antimicrobial fabric avoids reproduction of bacteria and plays a role in reducing the risk of re-transmission, which prevents bacterial residues on the drive wheels (24), the seat (1), the armrests (7), and the push handles, thereby avoiding infection.

2. The wheelchair for preventing the secondary transmission of the germs according to claim 1, further comprising slave wheels (26), the active wheels (25) being coaxially provided with the drive wheels (24), and the active wheels (25) and the drive wheels (24) being connected by transmission;

the slave wheels (26) and the rear wheels (23) are coaxially provided and connected by transmission;

the active wheels (25) and the slave wheels (26) are connected by the transmission belt (27).

3. The wheelchair for preventing the secondary transmission of the germs according to claim 2, wherein two groups of drive mechanisms (2) are arranged, and the drive mechanisms (2) are symmetrically arranged about the seat (1).

4. The wheelchair for preventing the secondary transmission of the germs according to claim 1, wherein the front wheels (22) are universal wheels.

5. The wheelchair for preventing the secondary transmission of the germs according to claim 4, wherein two groups of drive mechanisms (2) are arranged, and the drive mechanisms (2) are symmetrically arranged about the seat (1).

6. The wheelchair for preventing the secondary transmission of the germs according to claim 1, wherein two groups of drive mechanisms (2) are arranged, and the drive mechanisms (2) are symmetrically arranged about the seat (1).

7. The wheelchair for preventing the secondary transmission of the germs according to claim 4, wherein the frame (21) is provided with a support rod (3) extending diagonally downwardly at a front end, and footplates (4) are provided at ends of free ends of the support rod (3).

8. The wheelchair for preventing the secondary transmission of the germs according to claim 5, wherein the footplates (4) are provided with limiting members (5) at the rear ends, and the limiting members (5) are arc-shaped.

9. The wheelchair for preventing the secondary transmission of germs according to claim 8, further comprising wheelchair parking brakes (6), which are fixedly installed on the frame (21) and configured for braking of the rear wheels (23) and are disposed above the slave wheels (26).

10. The wheelchair for preventing the secondary transmission of germs according to claim 7, wherein armrests (1)

are provided at a left side and a right sides of the seat (1), and two push handles (8) are symmetrically provided at a back of the seat (1).

11. The wheelchair for preventing the secondary transmission of the germs according to claim 10, further comprising dirt-retaining boards (10), and the dirt-retaining boards (23) are cooperatively provided thereon with the rear wheels (10).

12. The wheelchair for preventing the secondary transmission of the germs according to claim 11, wherein the wheelchair further comprises active wheels (25), slave wheels (26), and a transmission belt (27); the active wheels (25) are coaxially provided with the drive wheels (24); the active wheels (25) are fixed coaxially with the drive wheels (24) by a bolt; the active wheels (25) and the slave wheels (24) are rotatably arranged on the first axle bar (252); the first axle bar (252) is rotatably connected to the frame (21) by a first axle sleeve (254); the end of the first axle bar (252) close to the frame (21) is limited by a first nut (253), and cooperates with the first axle sleeve (254) so that the first axle bar (252) is rotatably arranged on the frame (21); the slave wheels (26) and the rear wheels (23) are coaxially and connected by transmission.

13. The wheelchair for preventing the secondary transmission of the germs according to claim 12, wherein the slave wheels (26) are fixed at the rear wheels (23) via a fixing board (262), while the slave wheels (26) and the rear wheels are rotatably sleeved on a second axle rod (261); the second axle bar (261) is rotatably arranged on the frame (21) via a second axle sleeve (264) and then limited by the second nut (263), so that the slave wheels (26) and the rear wheels (23) are rotatably arranged on the frame (21); a transmission structure is formed by the active wheels (25), the slave wheels (26), and the transmission belt (27), includes a synchronous pulley, a belt pulley, or a sprocket, and realizes the synchronous transmission of the active wheels (25) and the slave wheels (26); and wherein the slave wheels (26) are fixed at the rear wheels (23) via a fixing board (262), while the slave wheels (26) and the rear wheels are rotatably sleeved on the second axle rod (261); and the second axle bar (261) is rotatably arranged on the frame (21) via a second axle sleeve (264) and then limited by the second nut (263), so that the slave wheels (26) and the rear wheels (23) are rotatably arranged on the frame (21).

* * * * *